United States Patent [19]
Thurston

[11] 3,820,381
[45] June 28, 1974

[54] FASTENER SYSTEM AND METHOD FOR INSPECTING SAME

[75] Inventor: Glenn C. Thurston, Del Mar, Calif.

[73] Assignee: Gulf Oil Corporation, San Diego, Calif.

[22] Filed: June 19, 1972

[21] Appl. No.: 263,879

[52] U.S. Cl. .................................. 73/40, 85/1.5 A
[51] Int. Cl. .......................................... G01m 3/26
[58] Field of Search ............... 73/40, 37, 88 F, 40.5; 85/1.5 A; 340/240

[56] References Cited
UNITED STATES PATENTS

| | | | |
|---|---|---|---|
| 342,709 | 5/1886 | Ruenzi | 340/240 |
| 583,405 | 5/1897 | Corbett | 340/240 |
| 1,323,030 | 11/1919 | Dodds | 85/1.5 A |
| 1,414,075 | 4/1922 | Dodds | 85/1.5 A |
| 3,130,628 | 4/1964 | Blinn | 85/1 T |
| 3,667,862 | 6/1972 | Parr | 73/40 |

Primary Examiner—Donald O. Woodiel
Attorney, Agent, or Firm—Fitch, Even, Tabin & Luedeka

[57] ABSTRACT

A fastener system is described in which one or more fasteners are each provided with an internal cavity coextensive with a region of potential failure of the fastener. A pressure is produced inside the cavity, the cavity is sealed off, and the pressure is monitored inside the cavity. A rapid pressure change indicates a defective fastener.

6 Claims, 3 Drawing Figures

FASTENER SYSTEM AND METHOD FOR INSPECTING SAME

This invention relates to fastener systems and, more particularly, to a fastener system which may be readily inspected for defects from a remote location.

In some situations, fastener systems require continuous or periodic inspection in order to ascertain their continuing integrity. This is particularly true in a situation where a failure of a fastener system could result in extensive damage to adjacent structural equipment, or could endanger personnel in the area. Thus, for example, a fastener system securing the integrity of structural elements against high pressure, vibration, dangerous chemicals, or atomic radiation, typically requires frequent inspection.

Occasionally, fastener systems which require constant or periodic inspection, are located in an area wherein inspection is exceedingly difficult or impossible. One example of such a situation is with respect to the bolts used to secure structural elements in a fluid circulator located within a prestressed concrete reactor vessel for a nuclear reactor system. Such a circulator is shown and described in connection with a gas cooled nuclear reactor in U.S. Pat. No. 3,520,640 issued July 14, 1970. Such a circulator is located in a suitable cavity within a prestressed concrete pressure vessel for the nuclear reactor. Access to the fluid circulator for inspection of bolts in critical areas thereof is exceedingly difficult or impossible under in-service conditions due to the presence of high pressure fluids and radiation.

It is an object of the present invention to provide an improved fastener system.

Another object of the invention is to provide a fastener system which may be readily inspected for integrity, even though located at an inaccessible area.

Other objects of the invention will become apparent to those skilled in the art from the following description, taken in connection with the accompanying drawings wherein.

Very generally, the fastener system of the invention comprises a plurality of fasteners 11 each having an internal cavity 12 coextensive with a region of potential failure of the fastener. Means 13 are provided for producing a pressure inside the cavity substantially different from the pressure immediately external to the region of potential failure of the fastener. Means 14 are provided for sealing off the cavity, and means 15 are provided for monitoring the pressure inside the cavity after it is sealed off.

Figure 1:
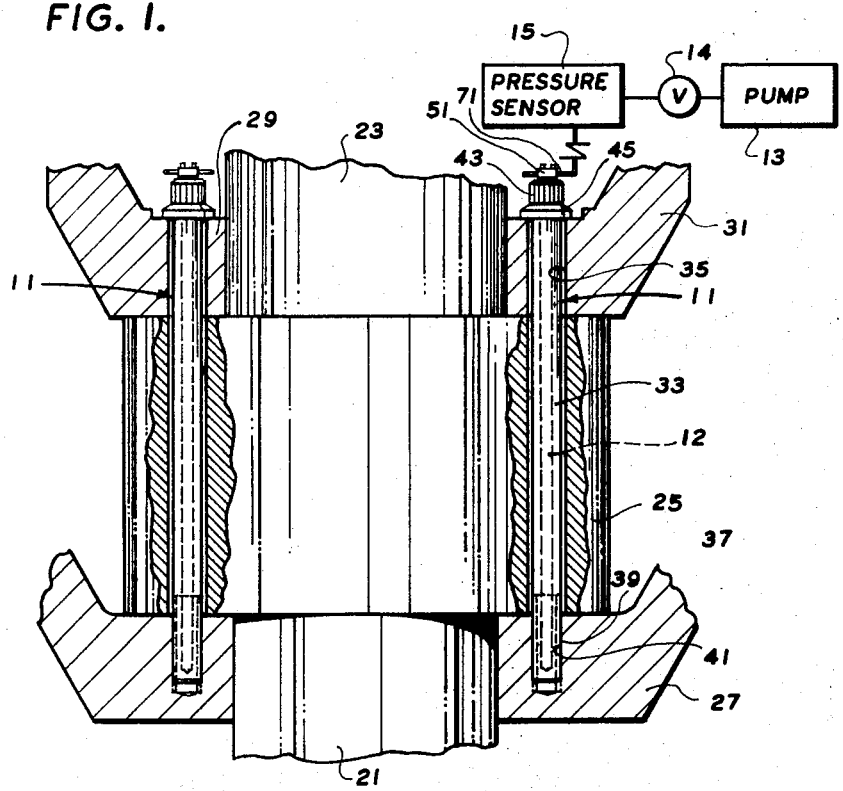
FIG. 1 is a sectional view, partially schematized, illustrating a fastener system constructed in accordance with the invention.

Referring now more particularly to FIG. 1, the system of the invention is shown as used in a portion of a fluid circulator such as that shown and described in the aforementioned U.S. Pat. No. 3,520,640. The fluid circulator includes a cylindrical lower portion 21 in which is disposed, among other elements, a shaft, not shown, for rotating the disc of a compressor, also not shown, to provide for fluid circulation within the cooling system of a nuclear reactor. The circulator includes a cylindrical upper portion 23, which contains, among other elements, a rotary shaft, not shown, which supports the rotor, not shown, of a driving turbine for the circulator. In between the lower portion 21 and the upper portion 23 is a cylindrical bearing housing 25 in which are disposed suitable bearings, not shown, which support the two previously mentioned shafts. The shafts, of course, are coupled in order that the turbine rotor may drive the compressor disc.

The circulator is supported by means of a suitable circulator support 27, only a portion of which is shown. The support 27 is mounted within a cavity in the pressure vessel (not shown) of a nuclear reactor. The bearing housing 25 is mounted to the support 27 by the fasteners 11. The fasteners also pass through an annular flange 29 of a steam turbine casing 31.

In the illustrated embodiment of the invention, the fasteners 11 comprise elongated bolts. Each of the bolts has a shank 33 which passes through an opening 35 in the flange 29 and through an opening 37 in the bearing housing 25. The lower ends of the shanks 33 are threaded in the regions 39 and are screwed into engagement with corresponding threads provided in bolt holes 41 in the support 27. The fasteners or bolts are arranged circumferentially about the axis of the circulator.

The upper end of each of the fasteners or bolts 11 comprises a head 43 joined to the shank 33 by a flange 45. The head 43 is formed with a plurality of angular serrations distributed circumferentially about its outer surface and parallel with each other and with the axis of the bolt. A correspondingly shaped tool is placed on the head of the bolt for tightening same under a predetermined design torque.

Figure 2:
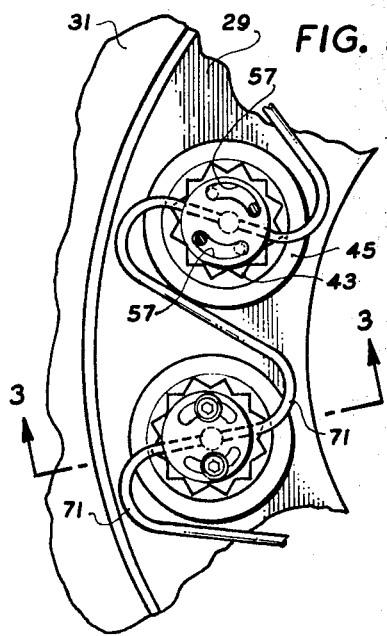
FIG. 2 is an enlarged top view of a portion of the fastener system of FIG. 1.
Figure 3:
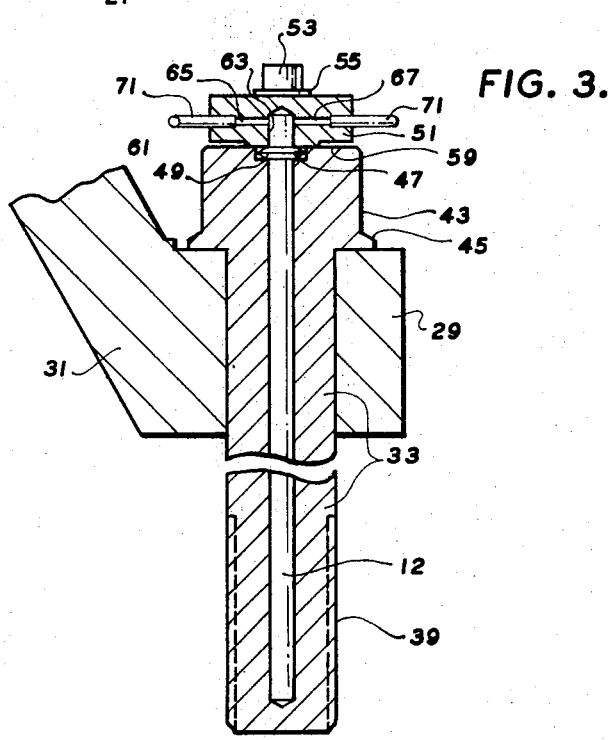
FIG. 3 is a sectional view taken along the plane 3—3 of FIG. 2.

Referring more particularly to FIGS. 2 and 3, the particular means by which the integrity of the fasteners 11 is monitored may be more clearly seen. As previously mentioned, each of the bolts or fasteners 11 is provided with a cavity 12 therein coextensive with the region of potential failure of the fastener. In the illustrated case, the cavity 12 comprises an elongated hole bored axially in the bolt from the head end thereof and terminating just prior to the lower end or opposite end of the bolt. Since the expected failure of the bolt would occur principally along its shank 33, the placement of the axial bored hole 12 is coextensive with the region of potential failure.

As may be seen in FIG. 3, the bored hole 12 extends upwardly through the head 43, terminating in a shallow counter-bore 47 in the top of the head. An annular seal 49 is placed in the counter bore and a test-cap 51 is mounted against the seal 49 over the counter-bore 47 by a pair of socket head cap screws 53 and washers 55. Only one of the cap screws 53 is visible in FIG. 3, and the heads of two of the cap screws and washers have been removed in FIG. 2 for clarity. As may be seen in FIG. 2, curved slots 57 are provided in the caps 51 in order that the caps may be oriented in a desired manner, for reasons explained below. Each of the caps is undercut in a region 59 displaced from the cavity 12 to form an annular wall 61 surrounding the upper terminus of the counter-bore 47.

Each of the caps 51 is provided with a central bore 63 which extends upwardly in the cap partially therethrough on the axis of the cap. The bore 63 provides communication through the counter-bore 47 with the bore or cavity 12 in the shank of the bolt. Horizontally bored holes 65 and 67 are provided in each of the caps on a diameter communicating with the central bore 63 therein. The bores 65 and 67 are provided with manifold tubes 71. As may be seen in FIG. 2, the manifold tubes serve to interconnect the central bores or cavities 12 in all of the fasteners 11. The curved slots 57 enable proper orientation of the caps 51 to align with the tubes 71.

A suitable coupling, not shown, connects the tubes 71 forming the manifold system to the pressure sensor 15. A valve 14 connects the sensor 15 to a pump 13. In order to perform a remote reading on the fastener system, the pump 13 is activated to either raise the pressure in the manifold system and therefore within the cavities 12 to a pressure exceeding the pressure surrounding the bolts or fasteners 11, or reduce the pressure therein to a pressure lower than the pressure surrounding the fasteners. Thus, in the illustrated embodiment, the pressure within the cavities 12 is brought to a substantially different pressure than the pressure existing in the space between the shank 33 and the openings 35 and 37.

After pressurizing the manifold system and the cavities, the valve 14 is closed to thereby seal off the cavities 12. The pressure sensor 15, which may be any suitable gauge or pressure sensor for reading the pressure in the manifold system and hence in the cavities 12, is then used to monitor the pressure decay or rise within the cavities. In the presence of a break or crack in any of the bolts, the pressure change will be rapid, since the pressure will leak through the break or crack from or into the surrounding space. Such a rapid change in pressure is sensed by the pressure sensor 15, thereby providing an indication of an impairment in the integrity of the fastener system.

In the event of a leak in the manifold system or in the pressure line extending from the pressure sensor to the manifold system, an observation will still be available at the pressure sensor, showing up as a defective part. Accordingly, the system is highly reliable.

It may therefore be seen that the invention provides a fastener system which highly reliable, achieved, and are useful in inspecting at a remote or inaccessible location. The system of the invention is manifolded as illustrated to provide a rapid check of an entire bolted unit. Inspection may be made without disturbing the integrity of the fastener system, and no partial disassembly is required for inspection.

Various modifications of the invention in addition to those shown and described herein will become apparent to those skilled in the art from the foregoing description and accompanying drawings. Such modifications are intended to fall within the scope of the appended claims.

What is claimed is:

1. A fastener system, including a plurality of fasteners, means secured by said fasteners and defining a substantially inaccessible location for said fasteners, each of said fasteners having a region of potential failure, an internal cavity in each of said fasteners coextensive with said region of potential failure of said fastener, a manifold system comprising a series of manifold tubes interconnecting said internal cavities in said fasteners, means for producing a pressure inside said manifold system and in said manifold tubes and in said cavities substantially different from the pressure immediately external to said regions of potential failure of said fasteners, means for sealing off said manifold system interconnected with said cavities from said means for producing a pressure, and means for continuously monitoring the pressure inside said manifold tubes and said cavities and to indicate a change in pressure in the event of a leak in said manifold system or in said fasteners.

2. A fastener system according to claim 1 wherein each of said fasteners comprises a bolt and wherein said cavity comprises an axial hole bored in said bolt from the head end thereof and terminating prior to the end opposite the head.

3. A fastener system according to claim 2 including a pressure cap secured to the head of each of said bolts, said pressure cap having means for coupling said hole to said manifold system.

4. A fastener system in accordance with claim 1 in which a cap is mounted on each of said fasteners over openings to said cavities in said fasteners, each of said caps having internal passage means aligned with an opening to a cavity and terminating at orifices in the sides of said cap, and means for adjusting the rotational position of said cap on said fastener for orienting the position of said orifices and said manifold tubes interconnecting said orifices in said caps.

5. A fastener system according to claim 4 wherein said adjusting means comprise a pair of curved slots in each of said caps, and a pair of screws one in each of said curved slots for securing said caps on said fastener.

6. A fastener system according to claim 5 wherein each of said caps has a seal surface thereon engaging said fastener on which it is mounted.

* * * * *

UNITED STATES PATENT OFFICE
CERTIFICATE OF CORRECTION

Patent No. 3,820,381            Dated June 28, 1974

Inventor(s) Glenn C. Thurston

It is certified that error appears in the above-identified patent and that said Letters Patent are hereby corrected as shown below:

Column 3, line 44 - insert "is" between "which" and "highly"; delete "achieved".

Column 3, line 45 - "are" should be -- is --.

Signed and sealed this 26th day of November 1974.

(SEAL)
Attest:

McCOY M. GIBSON JR.
Attesting Officer

C. MARSHALL DANN
Commissioner of Patents